Oct. 16, 1945.  E. L. GIBSON  2,387,014
ROTARY KILNS
Filed May 15, 1943
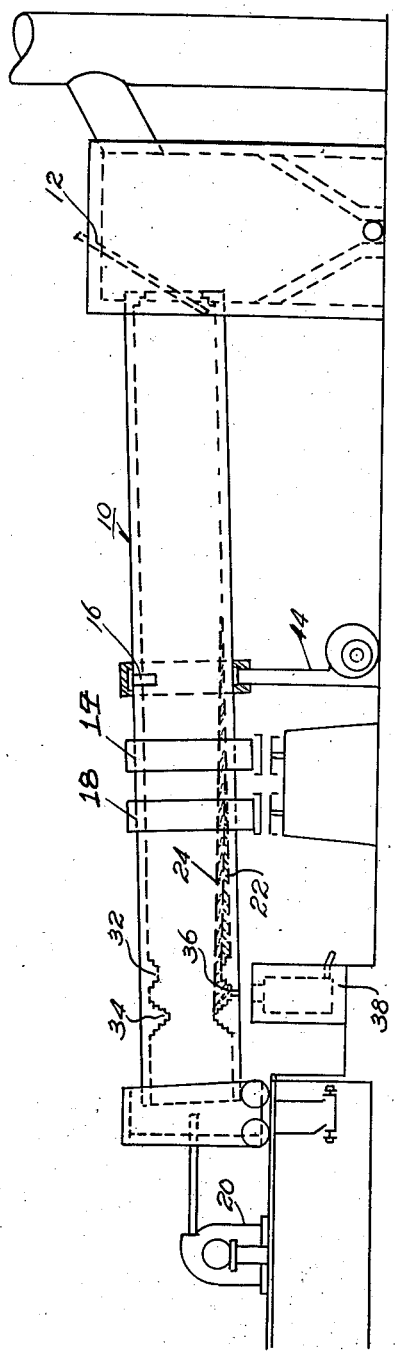
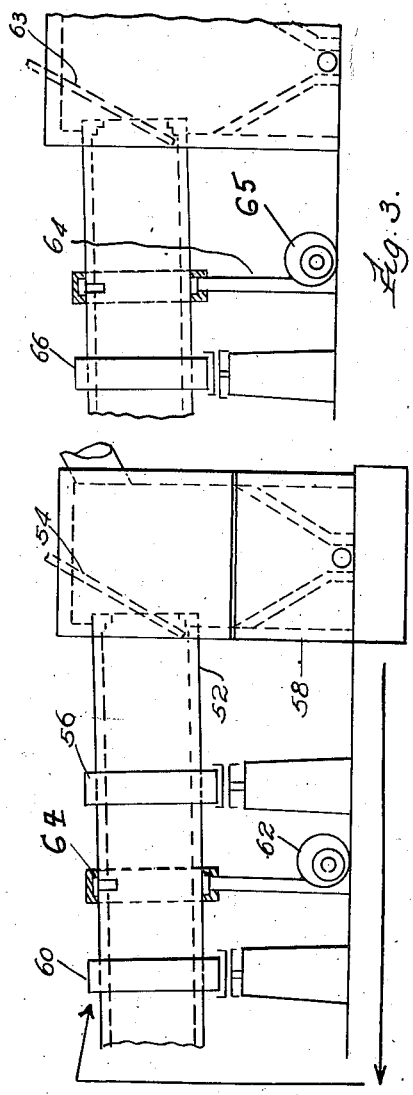
Inventor
Estell L. Gibson
by Albert J. Fihe
Attorney.

Patented Oct. 16, 1945

2,387,014

UNITED STATES PATENT OFFICE 2,387,014

ROTARY KILN

Estell L. Gibson, Park Ridge, Ill., assignor to Cowham Engineering Company, Chicago, Ill., a corporation of Delaware Application May 15, 1943, Serial No. 487,404

3 Claims. (Cl. 263—32)

This invention relates to a method and means of refining and reducing ores and producing and treating metals, and has for one of its principal objects the treatment of ferrous and non-ferrous ores or combinations of the same in a rotary kiln whereby the ores are both refined and reduced in a single continuous process.

One of the important objects of this invention relates to a means and method whereby ores may be refined and reduced within a rotary kiln and wherein the resultant metal is purified as desired and various grades and even alloys may be produced in a single process.

The invention described herein comprises an improvement over my prior application for United States Letters Patent entitled "Refinement of ore in a rotary kiln," Serial No. 481,786.

A still further important object of the invention is to combine the work formerly done in a blast furnace and an open hearth furnace into one operation within a rotary kiln. This process is applicable to the refining and reduction of the following ores, both ferrous and non-ferrous, and the purification and alloying of the resultant metal, such as, but not confined to iron, vanadium, chromium, manganese, molybdenum and nickel, the resulting products being the metals and alloy metals of the above. In addition, combinations of ores can be introduced into the processing in such a manner as to produce alloy irons or steels of the above metals such as ferro-manganese, ferro-vanadium, ferro-molybdenum, ferro-chromium, and iron or steels containing desired amounts of any of the above metals or any grade of steel.

A very important object of the invention resides in the fact that low-grade ores, both ferrous and non-ferrous, may be employed, and the non-ferrous content of some of these ores can be either included in or excluded from the final product, as desired, and the percentage varied within rather accurately controlled limits.

The preparation of the ores is similar to the process described in my aforesaid patent application, that is, the ore or a blend of ores together with a flux such as limestone or slag, are ground to a suitable fineness. The materials may be either ground separately or simultaneously. They are then thoroughly mixed with the reducing agent, which may either be coal, coke, or any carbon-bearing material in the proper proportions, and introduced into the kiln either in a wet or dry state. The material moves down the kiln counter-flow to the flame and the product of combustion, as described in the previous application for patent. Thereafter, the process is different and embodies the points of my new invention.

Other and further important objects of this new improvement will be apparent from the disclosures in the accompanying drawing and following specification.

The invention in a preferred form is illustrated in the drawing and hereinafter more fully described.

In the drawing:

Figure 1 is a side elevation of a rotary kiln equipped with the appurtenances whereby the preferred method of this improved invention may be carried out therein.

Figure 2 shows a similar kiln, illustrating a slightly different embodiment of the invention.

Figure 3 shows a kiln having appurtenances whereby another method of my new invention can be carried out.

As shown in the drawing:

The reference numeral 10 indicates generally a rotary kiln which may be a kiln such as ordinarily used in cement manufacture.

The ground ore or ores, together with a reducing agent and a flux, are introduced into the kiln through a feed pipe 12. At a point 14, which is positioned before the place where the final reduction of the ores has been accomplished and where the oxides have all been reduced to metallic iron, provision for introducing additional quantities of the reducing agent, such as coal or coke is made. An auxiliary air inlet is provided at 16, this being between the point 14 and the feed pipe 12, and at the point where no appreciable reduction of the ores has yet taken place.

The material then continues to travel down the kiln to a point where the metal begins to be transformed into a molten condition and separates out from the slag or clinker. At this point, designated by the reference numeral 18, provision is made for introducing ore or a combination of ores or other oxides in desired and measured quantities. The ores introduced at this point will have been reduced to the desired size by crushing or grinding, and the fineness will depend upon the characteristics of the ore and the general operating conditions, and may cover a very wide range, running from ½ inch down to 200 mesh. Other agents may also be introduced at this point to assist in the removal of undesirable constituents, such as sulphur.

The heat for bringing about the refining, reducing and purification process, is supplied by means of a burner pipe 20, such as is used in the invention of my previous application for patent. However, the flame from the burner pipe in this embodiment of the invention should be as neutral as possible, as distinguished from being in a highly reducing atmosphere. The flames should be only slightly reducing or slightly oxidizing within the limits of combustion control, and a bed of molten metal 22 will be maintained in the kiln with a covering of slag or clinker 24. This is accomplished by inserting two dams in the kiln 10, the dams being indicated by the reference numerals 32 and 34 respectively, and the dam 34 is higher than the dam 32, so that as the molten metal flows over the lower dam 32, it runs into the space between the dams. An opening 36 is provided through the kiln shell at this point so that as the kiln rotates, the metal will flow into the collector 38. Most of the clinker will pass over the higher dam 34 and out the end of the kiln. The opening 36 may be kept closed until a desired amount of metal has accumulated, and this may then all be withdrawn at one time by regulating the speed of the kiln rotation. This double dam construction will result in the continuous maintenance of a bed of molten metal in the kiln, which is protected from oxidation by a covering layer of slag. Furthermore, the maintenance of such a reservoir of molten metal of approximately the desired composition enables the operator to more nearly and accurately control the final product by small changes and additions of material through the introducing elements 14 and 18. Wide variations in the introduction of fluxes, reducing agents, ores and purifying agents are thereby avoided, while at the same time the final composition can be very accurately controlled. A reservoir helps maintain a desired temperature of the metal and a uniform operating condition in that zone. Small batch operation is also avoided.

Another manner of accomplishing this by the utilization of only one dam is to provide such a dam with an opening extending upwardly therethrough at an elevation somewhat below the crest, so as to allow molten metal to flow out through this opening, and the clinker will pass over the dam out the end of the kiln.

The rotation of the kiln provides a much more effective means of agitating the metal, thus aiding in the purification, and the separation of the slag from the metal is more efficiently accomplished in this way than by any other process. The molten slag may be drawn off with the metal, if such type of operation is desirable.

By the application of the supplementary reducing agent feeder 14 and the supplementary ore and/or oxide feeder 18, the composition of the metal can be corrected by the proper addition of ores and/or oxides, suitable amounts of reducing agent, or by addition of previously prepared metals. This assists in maintaining the proper equilibrium in the materials, and as the process is continuous, analyses may be taken at regular intervals and correction, if necessary, accomplished without undue delay, thereby assuring a practically perfect combination of metals and desired alloys in the finished product.

At each revolution of the kiln, some of the molten metal flows out through the tap hole 36 into the collector 38, which is provided with a heating means.

In Figure 2 a slightly modified form of the invention is illustrated, wherein a kiln 52 is supplied with raw material by means of a feed pipe 54, and this raw material is preliminarily dried and calcined to some extent. This material is then withdrawn from the kiln at a point indicated by the reference numeral 56. This withdrawn material is then delivered to a stock pile or mixer 58. In the mixer other ingredients in desired and measured quantities are added thereto, and this new composition is then reintroduced into the kiln at a point 60. A blower 62 and inlet for air 64 is provided for combustion of carbon monoxide and other kiln gases. The reintroduced product then follows the course previously described.

In Figure 3 the usual feed pipe 63 is used and a blower 65 is provided for additional combustion. At 66 a further combination of flux, reducing agent and ore or ores can be introduced into the kiln in desired and measured quantities so that the final resultant product can be accurately controlled.

It will be seen that herein is provided a new and improved process for refining and reducing ferrous or non-ferrous ores or any combination of same, and producing therefrom metals of a desired composition in a continuous operation. Desired changes in composition can be accomplished within the minimum time and continued as long as desired. The heat required for the reduction of the ores simultaneously supplies that necessary for purification of the metals, thus effecting a saving in fuel.

It will also be seen that this process accomplishes in one operation that which now requires a blast furnace plant and an open hearth or a Bessemer steel plant, and in addition to making low-grade ores available for the efficient production of high-grade metals, eliminates the tremendous investment required in the open hearth or blast furnace operation. This process is a good deal more economical, due to the smaller investment and the reduction of maintenance costs. However, the most important result of the entire process and invention resides in the fact that desired metals or alloys can be simply and efficiently produced in a single operation and a metal or alloy ready for use for any special purpose can be taken from the kiln without the necessity of subsequent alloying with other metals, which in itself comprises an enormous advantage.

I am aware that many changes may be made and numerous details of construction varied throughout a wide range without departing from the principles of the invention, and I, therefore, do not purpose limiting the patent granted hereon otherwise than as necessitated by the prior art.

I claim as my invention:

1. A means for refining and reducing ferrous and non-ferrous ores and combinations thereof, comprising a rotary kiln, a burner at the discharge end thereof, a feed pipe at the other end, an auxiliary air inlet for the kiln, an inlet for the introduction of a supplementary reducing agent at a point in the kiln between the discharge end and the auxiliary air inlet, and a further inlet for the introduction of additional ore and oxide and purifying agents to the kiln, together with a pair of dams adjacent the discharge end of the kiln and a discharge opening in the kiln between the dams.

2. A means for refining and reducing ferrous and non-ferrous ores and combinations thereof, comprising a rotary kiln, a burner at the discharge end thereof, a feed pipe at the other end, an auxiliary air inlet for the kiln, an inlet for the introduction of a supplementary reducing agent at a point in the kiln between the discharge end and the auxiliary air inlet, and a further inlet for the introduction of additional ore and oxide and purifying agents to the kiln, such inlet being adjacent to and preferably below the inlet for the supplementary reducing agent, together with a pair of dams adjacent the discharge end of the kiln, the dam closest to the discharge end being higher than the other, whereby a reservoir of molten metal is continuously maintained in the kiln, together with a protective layer of slag thereabove, an opening between the dams for withdrawal of accumulated molten metal, as desired, and means for discharging slag at the end of the kiln.

3. A means for refining and reducing ferrous and non-ferrous ores and combinations thereof, comprising a rotary kiln, a burner at the discharge end thereof, a feed pipe at the other end, an auxiliary air inlet for the kiln, an inlet for the introduction of a supplementary reducing agent at a point in the kiln between the discharge end and the auxiliary air inlet, a further inlet for the introduction of additional ore, oxide and purifying agents to the kiln, together with a pair of dams adjacent the lower end of the kiln, one dam for retaining a bed of molten metal in the kiln and the other dam being slightly higher than the first and provided for retaining a protective layer above the molten metal.

ESTELL L. GIBSON.